Jan. 10, 1939.  T. H. SCHOEPF ET AL  2,143,284
AIR CONDITIONING APPARATUS FOR RAILWAY VEHICLES
Filed Sept. 9, 1936  6 Sheets-Sheet 1
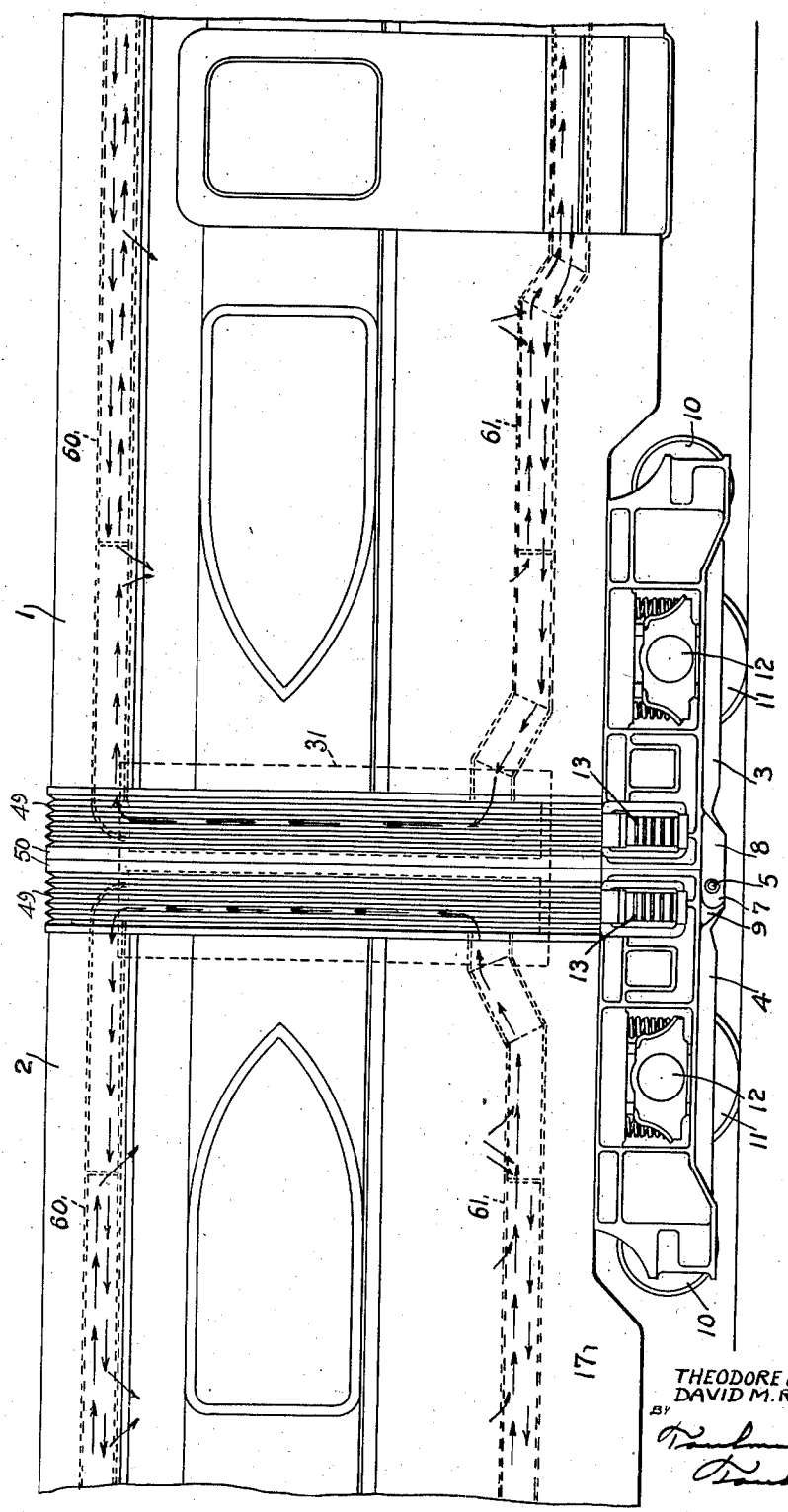
THEODORE H. SCHOEPF,
DAVID M. RITCHIE,
Attorney

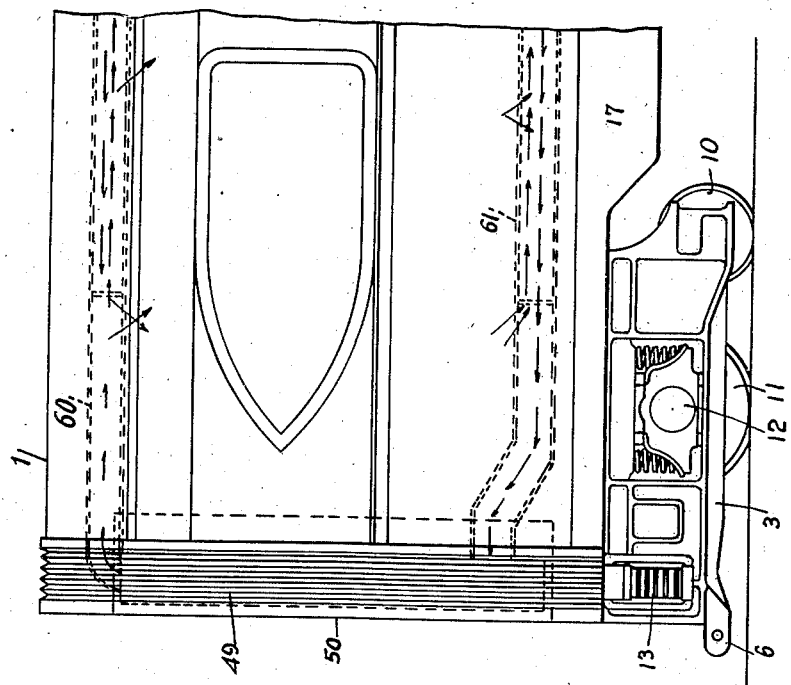
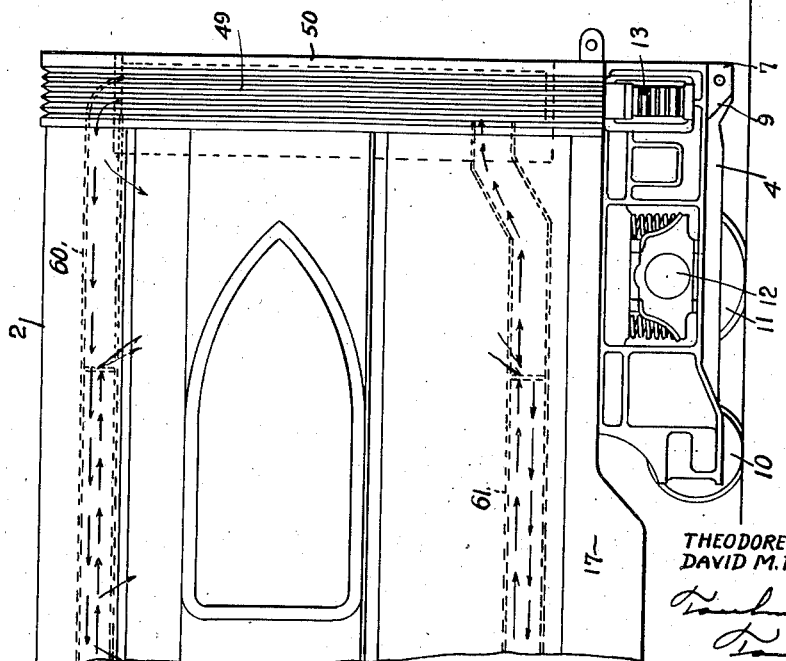

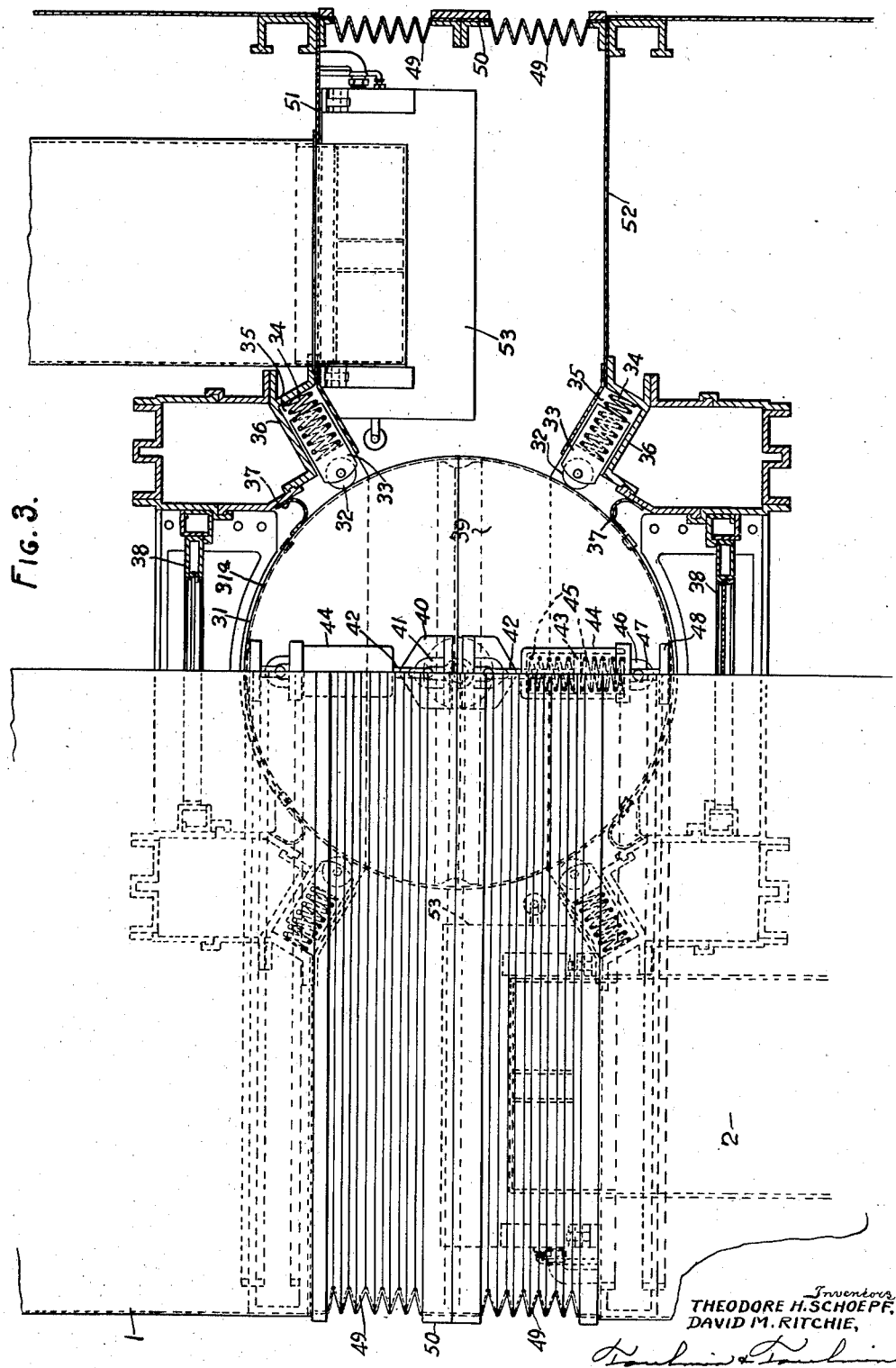

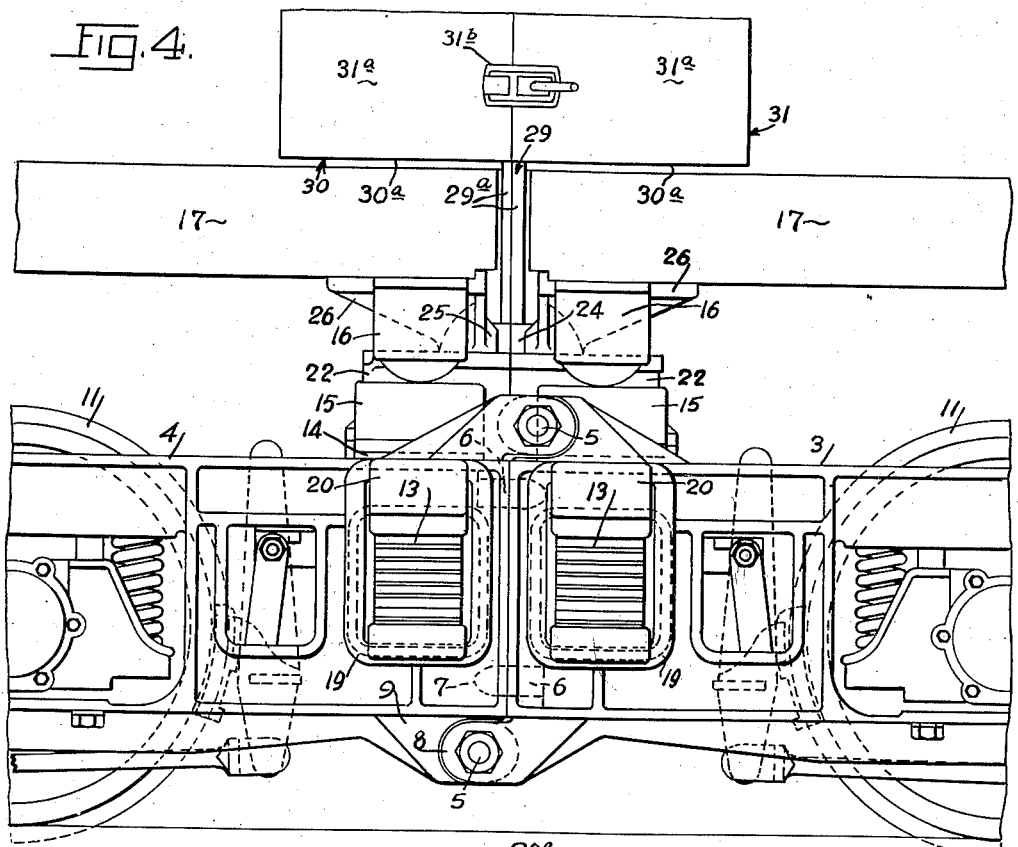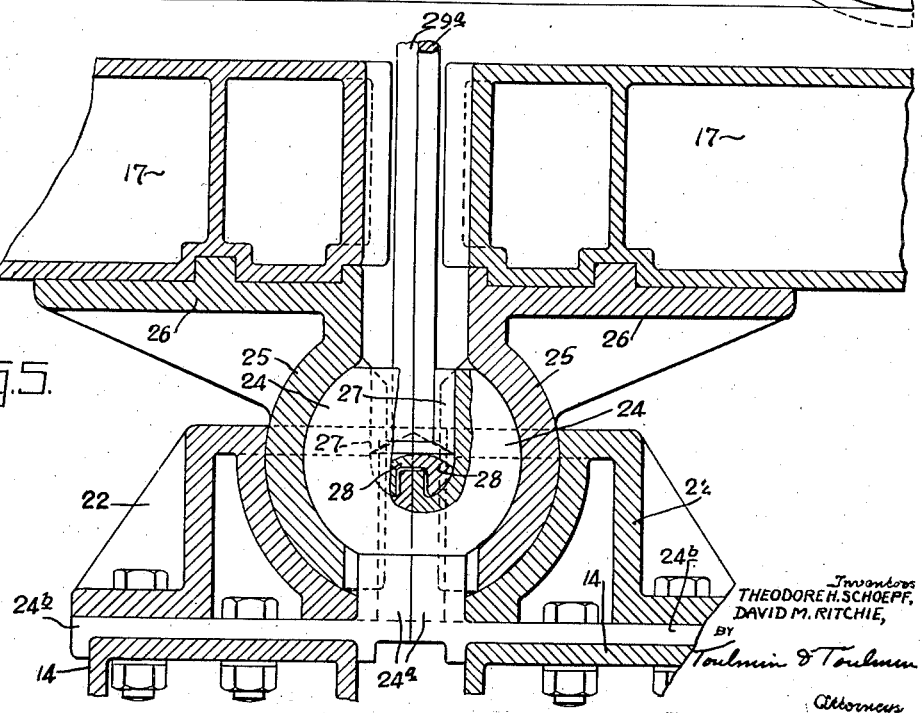

Jan. 10, 1939.  T. H. SCHOEPF ET AL  2,143,284
AIR CONDITIONING APPARATUS FOR RAILWAY VEHICLES
Filed Sept. 9, 1936  6 Sheets—Sheet 5

Inventors
THEODORE H. SCHOEPF,
DAVID M. RITCHIE,
BY
Attorneys.

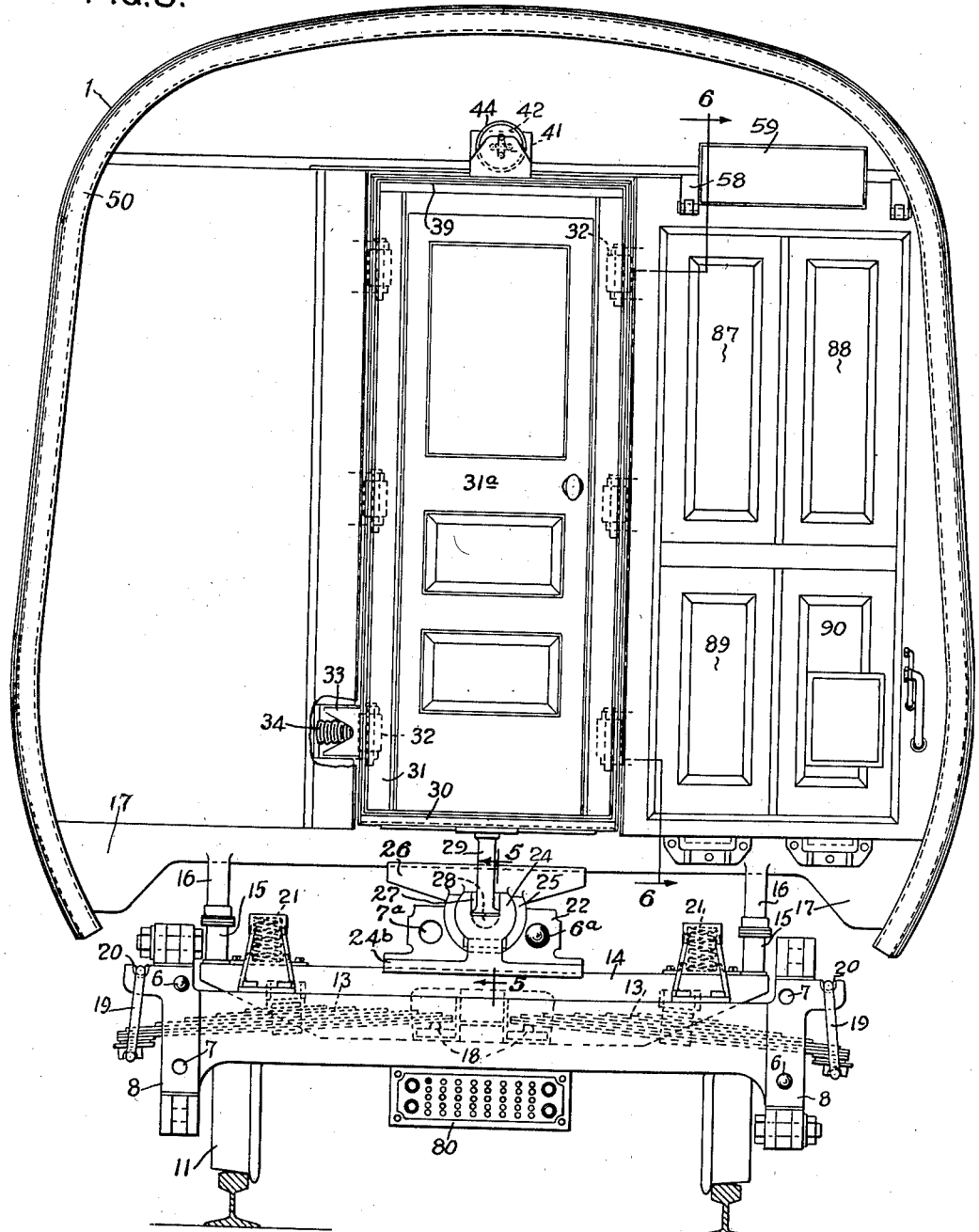

Patented Jan. 10, 1939

2,143,284

UNITED STATES PATENT OFFICE 2,143,284

AIR CONDITIONING APPARATUS FOR RAILWAY VEHICLES

Theodore H. Schoepf and David M. Ritchie, Cincinnati, Ohio, assignors to The Cincinnati Traction Building Co., Cincinnati, Ohio, a corporation of Ohio Application September 9, 1936, Serial No. 99,996

5 Claims. (Cl. 105—4)

Our invention relates to air conditioning apparatus for railway vehicles.

It is an object of our invention to provide an air conditioning apparatus for railway vehicles, in which there is a combination of the advantages of an articulated truck beneath the adjacent ends of adjacent car bodies, the advantages of a separable truck for the respective ends of the adjacent car bodies and the advantage of an air conditioning unit being carried on the end of each car body adjacent the end of the adjacent car body, so that the air conditioning unit can be carried in the space between the two adjacent car bodies.

It is an object of this invention to provide in this combination a detachable vestibule which is detachably supported by one car body in overlapping engagement therewith and, when this car body is assembled with the adjacent car body and the separable trucks are connected to form a single truck, then the air conditioning units supported on the respective faces of the respective ends of the respective car bodies will be enclosed in the space between the vestibule, the ends of the car bodies and the outer walls thereof for the collapsible vestibule surfaces constituting a continuation of the outer walls thereof.

It is our particular object to provide a distribution system for conditioning the interior of a railway vehicle in association with the detachable air conditioning unit mounted on the end of the vehicle in space that is customarily lost space, as it is the area between the ends of the vehicle that is necessary for the relative movement of the two vehicles with respect to one another upon the common truck which supports these ends.

An important object of this invention is that the air conditioning apparatus is all located in a removable cabinet. In case of failure of this equipment the cabinet is replaced by another cabinet unit. The work of repairing the equipment in the cabinet can be done in the shop at a saving of time and costs. The work does not have to be done on the tracks or in train sheds in all kinds of weather. The vehicle can be kept in regular service with no loss of time or laid-up equipment due to air conditioning apparatus.

Referring to the drawings:

Figure 1 shows the adjacent ends of adjacent car bodies connected together and their respective trucks connected together to form a single truck to serve as a support for the articulation of the two car bodies on the common truck. The air distributing ducts and air conditioning units are shown in dotted lines.

Figure 2 is a similar view with the car bodies separated, showing the independent support of the car bodies by the separable trucks and the independent support of the air conditioning units by the respective car bodies.

Figure 3 is a top plan view, partially in section, showing the arrangement of the accordion vestibule, the vestibule drum, the yielding supports therefor and air conditioning units.

Figure 4 is a fragmentary elevational view illustrating the means to support the car bodies articulately on the truck halves and showing the overlapping relationship between the vestibule and the adjacent car platforms;

Figure 5 is an enlarged fragmentary section illustrating details of the vestibule supporting means, taken substantially on the line 5—5 of Figure 8;

Figure 8 is an elevation of one end of a car body with the air conditioning cabinet removed showing the panel construction permitting access from the inside of the car to the air conditioning cabinet.

Figure 6:
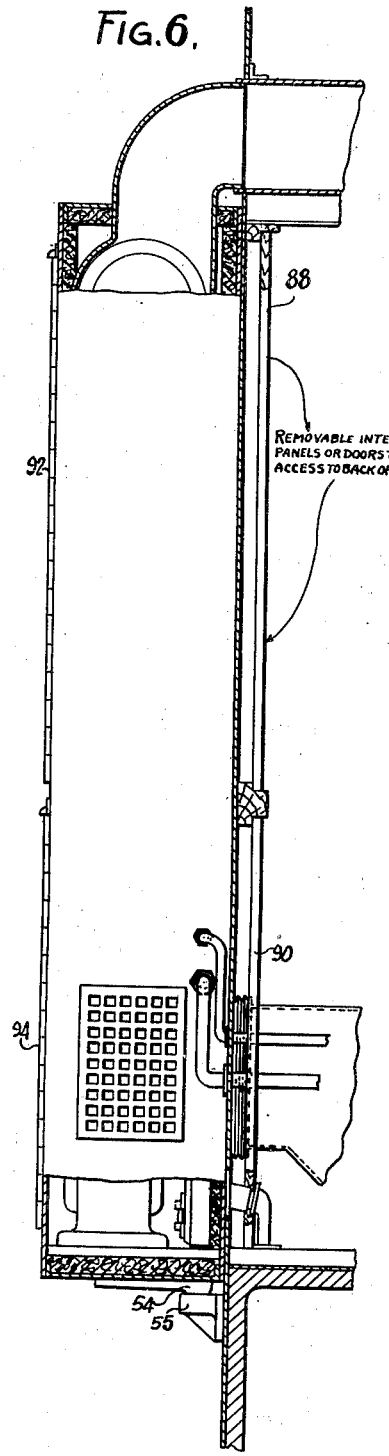
Figure 6 is a section on the line 6—6 of Figure 8.
Figure 7:
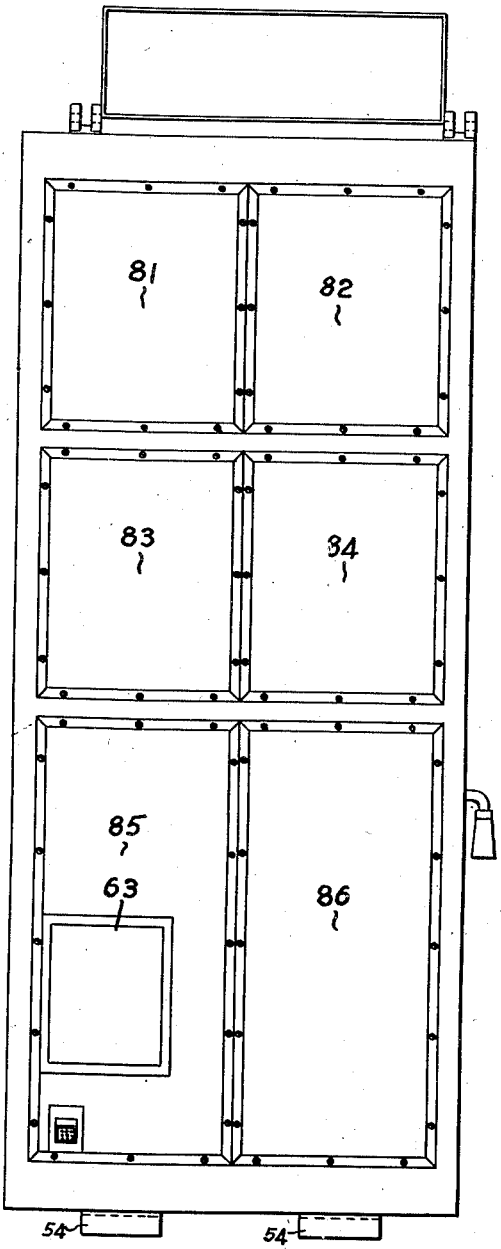
Figure 7 is a rear elevation of the air conditioning cabinet.

Referring to the drawings in detail, I designates a car body and 2 an adjacent car body. These car bodies are mounted upon a common truck consisting of the halves, generally designated 3 and 4. These halves are joined together by the anchoring pins 5 and aligning studs 6 and sockets 7 arranged on the adjacent frame members 8 and 9. Each truck half is provided with a rear wheel 10 which can be raised and lowered at will, as is more fully set forth in our application Serial No. 7,752 filed Feb. 23, 1935, which describes completely this truck and the method of support of the cylindrical vestibule hereinafter described.

The wheel 10 is only lowered when the halves of the truck are separated, as in Figure 2. In addition to the wheels 10 with their axle, there are the main wheels 11 having an axle 12 in each truck half. A pair of transverse bolster springs 13 yieldingly support the bolster 14 of each truck half which carries side bearings 15 engaging the side bearings 16 on the opposite sides of the bottom of the car frame 17. The inner ends of these springs 13 rest upon pads 18 mounted upon the frame of the truck. The outer ends of these springs are supported upon swinging links 19 pivoted upon the truck frame 20.

The center portions of the springs 21 engage opposite end portions of the bolsters 14. The bolster 14 of each truck half carries a socket casting 22 which is equipped with a pin 6a and a socket 7a for cooperative engagement with similar complementary means on the adjacent truck half.

Each socket casting 22 is provided with a casting forming a half ball member 24 connected by the stem portion 24a with the integral base portion 24b. The base portion 24b is bolted directly to its supporting bolster 14. When the truck halves are secured together, the members 24 abut closely to form a ball member which is adapted to be disposed within a socket member formed by two socket halves 25.

The socket halves 25 are formed integrally with bracket members 26. Each bracket member 26 is rigidly secured to an end of a car frame 17. Each ball forming member 24 is provided, internally, with a half socket 27 which is so disposed therein that, when the members are secured together, a socket extends downwardly into the ball member formed thereby to support the inner ball member formed by the two abutting half ball members 28.

Each of the abutting half ball members 28 is integral with one of the two semi-cylindrical pin members 29a which abut together to form the supporting pin 29 for the semicircular bottom members 30a. The semicircular bottom members 30a form the bottom 30 of the vestibule 31. The upper end of each pin member 29a is rigidly secured to one of the bottom members 30a, as shown in Figure 4.

As also shown in Figure 4, the complementary arcuate side walls 31a of the vestibule 31, which are rigidly secured to the respective bottom members 30a, are detachably secured together at their abutting edges by the latch members 31b.

This vestibule is arranged in overlapping relationship to the car frame 17 and the floor that it supports, as shown in Figure 4. It is maintained in its substantially vertical position by a plurality of oppositely disposed spaced spring pressed rollers 32 which are carried in roller supports 33 that are impelled towards the vestibule by the springs 34 mounted within the sockets or cages 35 in the end of the frame 36 constituting a part of the door structure of the car. This frame 36 of the car is engaged with a yielding, sealing strip 37 carried on the vestibule 31.

The cylindrical vestibule has cut-away door portions 31a to permit the passage of passengers therethrough from car to car. Each car is provided with a door 38 mounted in the frame 36.

The top of the vestibule is held in position by the following mechanism. There is mounted on top of the vestibule cover 39 a bracket 40 which has oppositely disposed eyes 41. These eyes are connected to piston rods 42 having pistons 43 working in the cylinders 44. There are springs 45 on either side of each piston 43. The cylinder 44 is connected by a staple 46, to a corresponding staple 47 mounted on the pad 48 which is in turn mounted upon the car body face. This vestibule is yieldingly held in its vertical position despite the swinging movements of the car bodies on the articulation and the vertical movements due to brakes in grade.

The adjacent car bodies have connected on their ends the collapsible accordion vestibules 49, the outer ends of which are connected to the arcuate frame member 50 that is supported at its bottom by the car frame members 17.

This leaves a space between the adjacent end walls 51 and 52 of the adjacent car bodies, the accordion vestibules 49 and the vertical side wall 31 of the vestibule drum. This space is partially occupied by the detachable air conditioning cabinets 53 which are supported (see Figure 8) by lugs 54 in socket brackets 55 bolted on the face of the end sill casting or floor frame 17 of the car body. The top of this cabinet is connected by straps 56, removable bolts 57 and ears 58 on the car body face 51 or 52. By removing the bolts 57 and lifting the cabinet 53, it is possible to completely remove the entire air conditioning apparatus for service, replacement or repair, without putting the train out of permanent commission, while the servicing or repairing is being carried out. The top of the cabinet is detachably connected to a discharge vent passageway 59 which communicates with the discharge passageway 60 in the top of the car to which the air conditioning cabinet 53 is attached. The return air passes through the passageway 61 (Figs. 1 and 2), whence it enters the cabinet 53 at the bottom.

In operation, the adjacent cars, when coupled together, act as any other articulated train would act. To all intents and purposes, it is a solid articulated train. The difficulty with articulated trains has been that being a complete unit of a series of car bodies, if anything happened to the apparatus of any one of the car bodies, it placed the entire train out of commission. By the present invention, it is possible to separate the bodies independently, one of the other, with independent trucks and to remove one of the bodies and replace it with another without necessitating the complete dismantling of the train. Furthermore, by placing the air conditioning cabinets, as indicated, two cabinets for each car body, one on each end, it is possible to merely separate the trucks and the car bodies, lift out the air conditioning cabinet which is detached in the simple manner described, replace it with a new one, again connect the bodies and trucks, and the train can continue, while the air conditioning equipment can be serviced or repaired in a shop where that work can be much more conveniently done than attempt to perform the same service upon the air conditioning equipment while on the train.

We have provided the usual jump-over connections, as indicated, on the jump-over engaging plate 80.

The air conditioning cabinet is optionally provided with a series of removable back panels 81, 82, 83, 84, 85 and 86. These panels are directly behind corresponding panels in the end of the car body as at 87, 88, 89 and 90. Thus, if individual pieces of equipment are to be adjusted or removed, the opening of the panels 87 to 90 inside of the car will enable access to the panels 81 to 86 in the back of the cabinet. This can be done without going between the car bodies or removing the cabinet from its position on the car body.

The front of the cabinet is provided with access doors 91, 92, 93 and 94 (see Fig. 8).

It will be understood that we desire to comprehend within our invention such modifications as come within the scope of the claims and the invention.

Having thus fully described our invention, what we claim as new and desire to secure by Letters Patent is:

1. In combination, a pair of adjacent car bodies having air distribution systems therein, independent trucks beneath the adjacent ends of said bodies so arranged as to be detachably attached to one another to form a common truck for both bodies, means to articulately support said car bodies upon said joined trucks, a common vestibule of smaller transverse dimension than said car bodies arranged in overlapping engagement with end platforms of said car bodies and therebetween, and means for supporting said vestibule on said trucks and means for detachably supporting an air conditioning unit exteriorly on the said adjacent ends of the respective car bodies on opposite sides of said vestibule.

2. In combination, a pair of adjacent car bodies having air distribution systems therein, independent trucks beneath the adjacent ends of said bodies so arranged as to be detachably attached to one another to form a common truck for both bodies, means to articulately support said car bodies upon said joined trucks, a common vestibule arranged between adjacent ends of said car bodies in overlapping engagement with the end platforms of said car bodies and of smaller transverse dimension than said bodies, means for supporting said vestibule on said trucks, means for detachably supporting an air conditioning unit exteriorly on the respective adjacent ends of the respective car bodies on opposite sides of said vestibule, and extensible means carried by the adjacent ends of said car bodies and adapted for connection to form a common enclosure for said vestibule and air conditioning units between the adjacent car ends.

3. In combination, a pair of adjacent car bodies each having an air distribution system therein, independent trucks arranged beneath the adjacent ends of said bodies so arranged as to be detachably attached to one another to form a common truck for both bodies, means to articulately support said car bodies upon said joined trucks, a common vestibule arranged between adjacent ends of said car bodies in overlapping engagement with the end platforms of said car bodies and of smaller transverse dimension than said bodies, means for supporting said vestibule on said trucks, means for detachably supporting an air conditioning unit exteriorly on respective adjacent ends of the respective car bodies on opposite sides of said vestibule, and extensible means carried by the adjacent ends of said car bodies for forming a common enclosure for said vestibule and air conditioning units, said air conditioning units being of such thickness as to permit of the relative movement of said car bodies while extending from the floor to adjacent the roof of each car body.

4. In combination, a pair of adjacent car bodies each having air distribution passageways therein communicating with ports in the end walls of the bodies, air conditioning units connected to said ports and detachably mounted exteriorly on the adjacent ends of said car bodies on opposite sides of said ends, a common vestibule of smaller transverse dimension than said car bodies located between said air conditioning units, a common separable truck for supporting said car bodies in articulated relationship or independently of one another, and means carried by said respective car bodies comprising accordion vestibule continuations of the outside walls of said body for enclosing the space therebetween and enclosing said air conditioning units and vestibule.

5. In combination, a common truck, adjacent car bodies pivotally mounted thereon independent of one another, and having air distribution systems therein, a common vestibule for said car bodies of smaller transverse dimensions than said car bodies and disposed between adjacent ends thereof, and air conditioning units detachably mounted exteriorly on the adjacent end faces of said car bodies on opposite sides of said vestibule and detachably connected to the respective air distribution systems, one of said units being on the righthand of said vestibule and the other of said units being on the lefthand of said vestibule, whereby the weight of said units is equally distributed about the support of said bodies on said truck.

THEODORE H. SCHOEPF.
DAVID M. RITCHIE.